(12) United States Patent
Havinga

(10) Patent No.: US 8,176,976 B2
(45) Date of Patent: May 15, 2012

(54) LUBRICATOR FOR USE WITH COILED TUBING APPARATUS AND UNIVERSAL RIG HAVING COILED TUBING AND TOP DRIVE CAPABILITY

(76) Inventor: Richard D. Havinga, Okotoks (CA)

( * ) Notice: Subject to any disclaimer, the term of this patent is extended or adjusted under 35 U.S.C. 154(b) by 0 days.

(21) Appl. No.: 12/898,226

(22) Filed: Oct. 5, 2010

(65) Prior Publication Data

US 2011/0073299 A1    Mar. 31, 2011

Related U.S. Application Data

(63) Continuation of application No. 12/088,908, filed on Apr. 1, 2008, now Pat. No. 7,810,556.

(60) Provisional application No. 60/723,111, filed on Oct. 3, 2005.

(51) Int. Cl.
*E21B 19/22* (2006.01)

(52) U.S. Cl. ............... 166/77.2; 166/77.3; 166/85.1; 166/85.5; 166/385

(58) Field of Classification Search .............. 166/77.3, 166/77.2, 85.1, 85.5, 385
See application file for complete search history.

(56) References Cited

U.S. PATENT DOCUMENTS

| 5,234,053 | A | * | 8/1993 | Connell | 166/250.01 |
| 7,182,140 | B2 | * | 2/2007 | Wood | 166/379 |

* cited by examiner

*Primary Examiner* — Jennifer H Gay
*Assistant Examiner* — Yong-Suk Ro
(74) *Attorney, Agent, or Firm* — Bushman & Associates, P.C.

(57) ABSTRACT

A lubricator for use with a coiled tubing injector comprising an elongated housing having a first end and a second end. There is a guide system disposed in the housing for guiding coiled tubing passing through the housing, a first director proximal the first end of the housing to direct the coiled tubing in a first direction and a second director proximal the second end of the housing to direct the coiled tubing in a second direction.

20 Claims, 5 Drawing Sheets

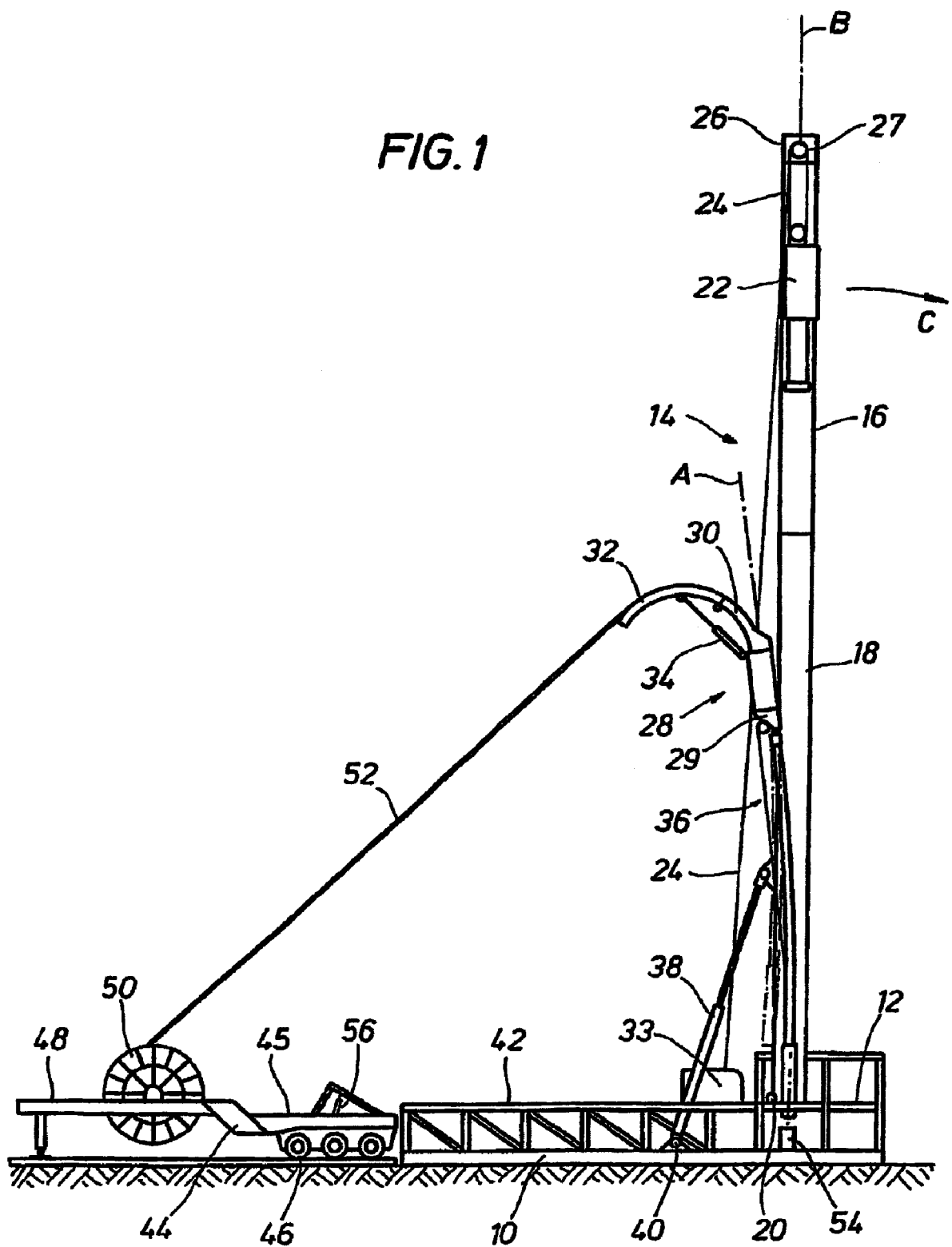

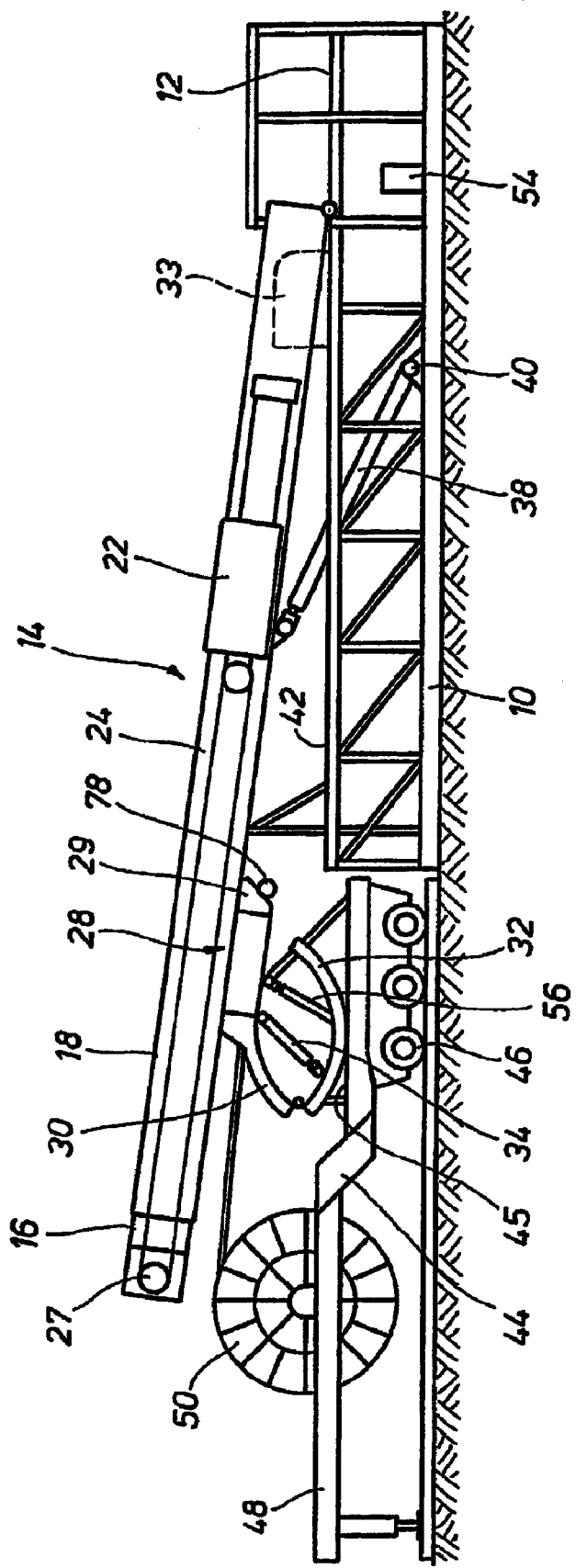

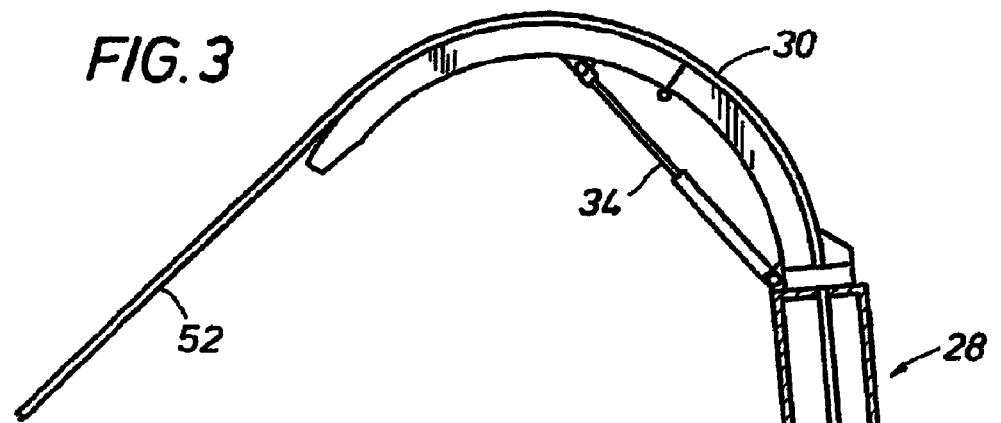
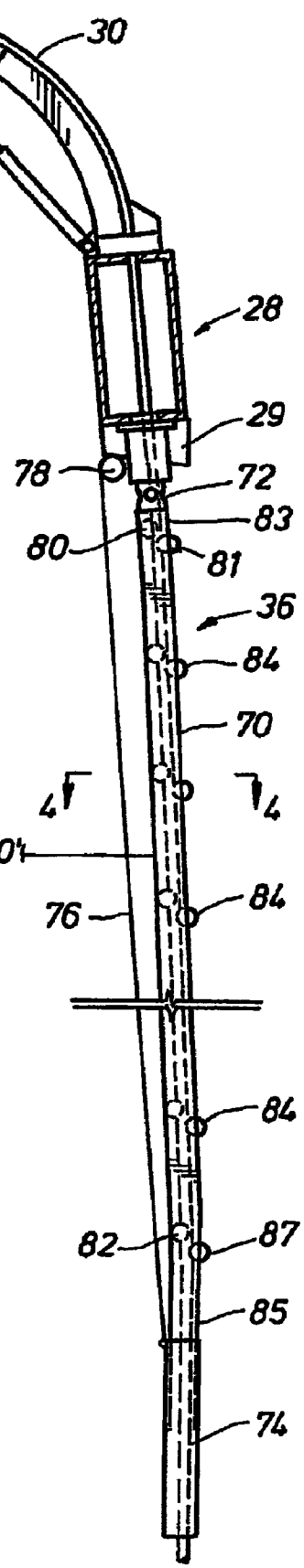
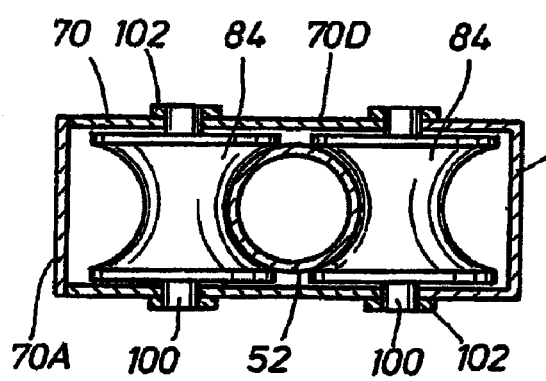
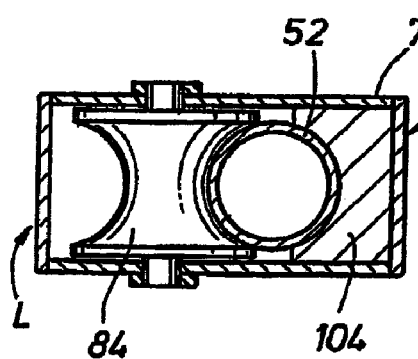
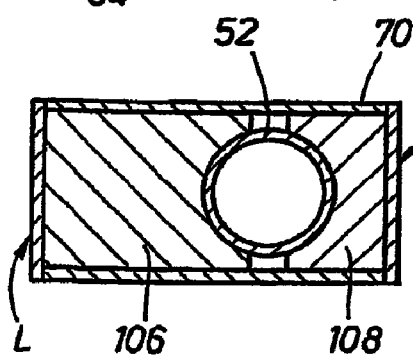

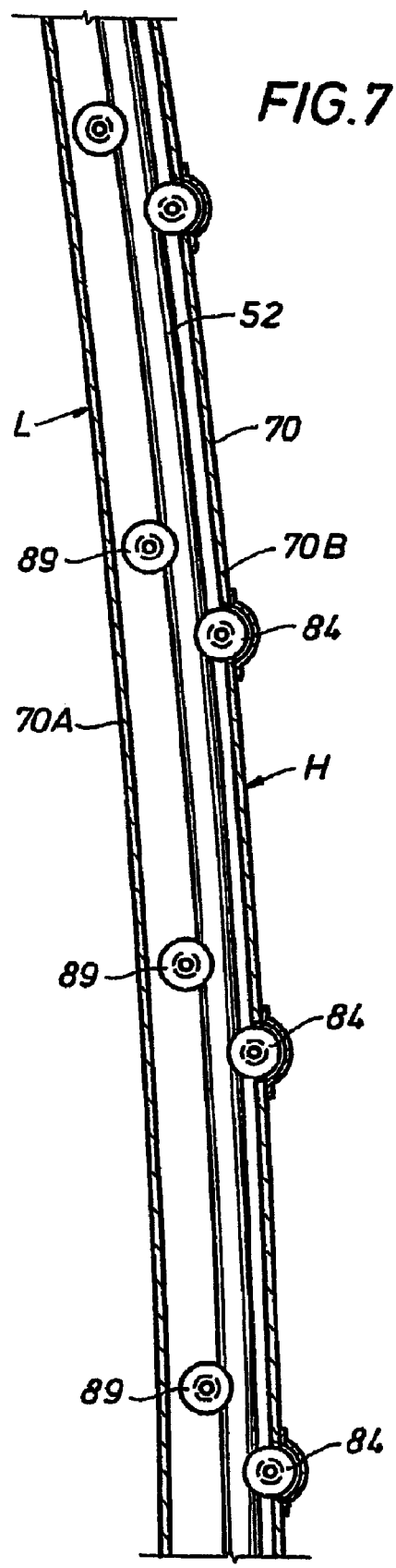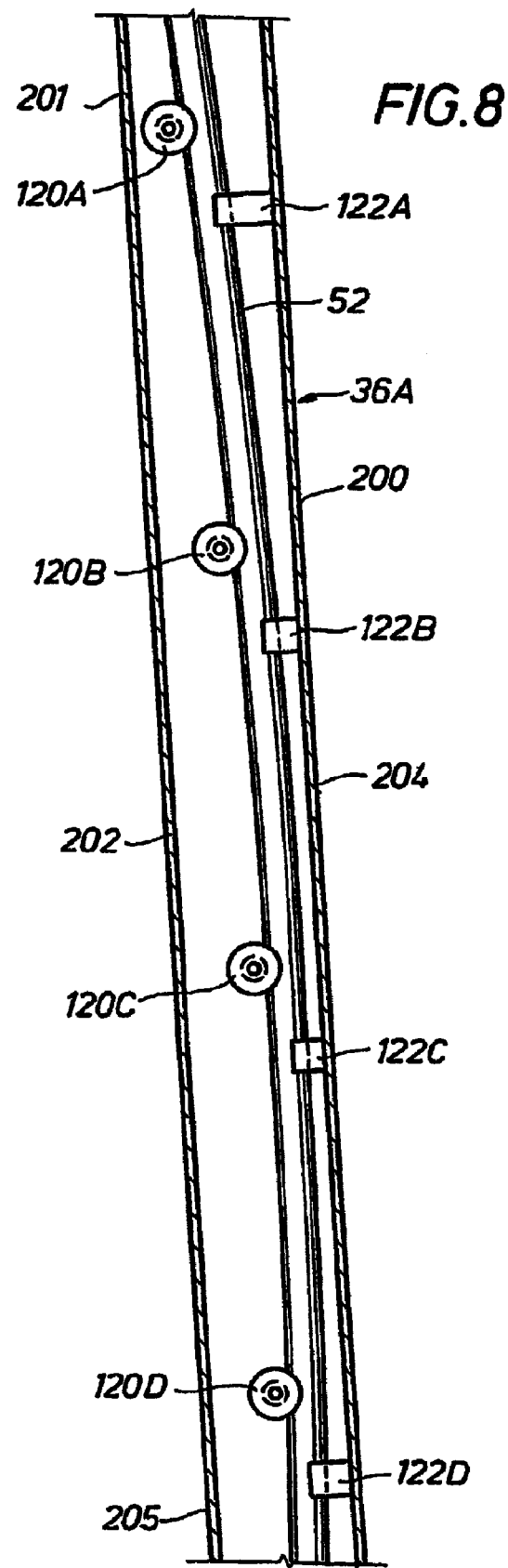

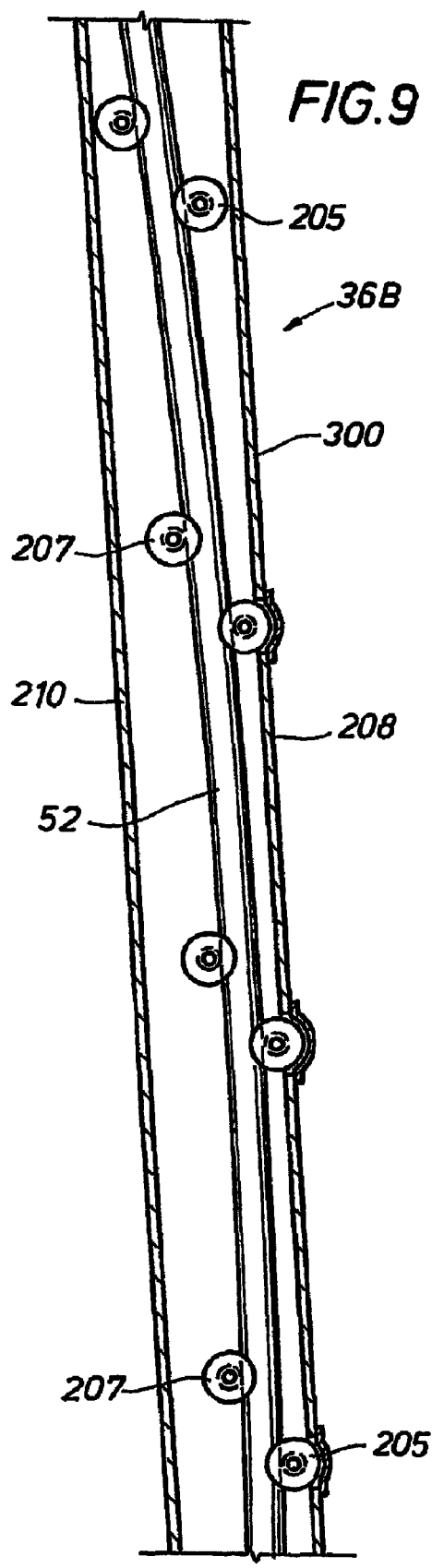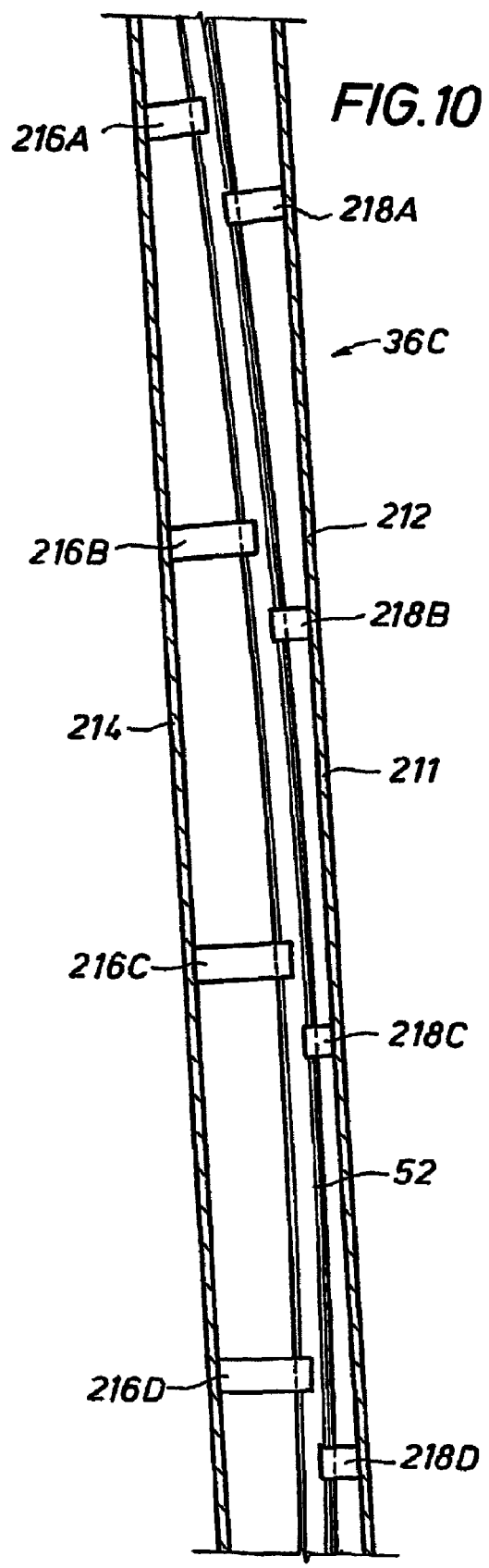

LUBRICATOR FOR USE WITH COILED TUBING APPARATUS AND UNIVERSAL RIG HAVING COILED TUBING AND TOP DRIVE CAPABILITY

CROSS REFERENCE TO RELATED APPLICATION

This application is a continuation of U.S. patent application Ser. No. 12/088,908 filed Apr. 1, 2008 now U.S. Pat. No. 7,810,556, which in turn claims priority of U.S. Provisional Application Ser. No. 60/723,111 filed Oct. 3, 2005, both of which are incorporated herein in their entirety for all purposes.

FIELD OF THE INVENTION

The present invention relates to apparatus for performing earth borehole operations employing coiled tubing (CT) and conventional top drive equipment. In a particular embodiment, the present invention relates to a lubricator for use with a CT apparatus.

BACKGROUND OF THE INVENTION

In copending U.S. application Ser. No. 11/165,931 filed Jun. 24, 2005 entitled COILED TUBING/TOP DRIVE RIG AND METHOD ('931 Application) and Ser. No. 11/294,036 filed Dec. 5, 2005 and entitled COILED TUBING/TOP DRIVE RIG AND METHOD ('036 Application), both of which are incorporated herein by reference for all purposes, there is disclosed a universal rig which is capable of selectively manipulating jointed pipe as well as CT. The rig disclosed in the aforementioned '931 and '036 Applications includes a mast extending upward from a rig floor or support, the mast being movable between a first position wherein a top drive carried by the mast and positioned over a wellhead can be employed, to a second position wherein a CT injector carried by the mast can be positioned over the wellhead and employed. In the rig disclosed in the '931 and '036 Applications, the CT apparatus is usually mounted on the mast but in general is positioned such that the CT injector has an axis offset from the axis of the top drive which, when the mast is generally vertically aligned, is positioned over a wellhead assembly/wellbore.

As disclosed in the '931 and '036 Applications, in order for the CT injector to be positioned with its axis generally coincident with the axis of the wellhead assembly/wellbore, it is necessary to pivot the mast from a substantially vertical position to a position at an angle to the vertical.

In certain cases, it may be desirable if the mast could be maintained in a substantially vertical position at all times regardless of whether earth borehole operations were being conducted using the top drive or the CT injector which, as noted above, has an axis which is not coincident with the axis of the top drive. Thus, with the mast in the vertical position, both top drive and CT operations could be conducted.

SUMMARY OF THE INVENTION

In accordance with one aspect of the present invention there is provided a lubricator for use with a CT injector, the lubricator comprising a housing, e.g., a tubular body, which will accept CT from a CT injector whose centerline or axis is not coincident with, e.g., at an angle to the axis or centerline of a wellhead assembly/wellbore, but will direct the CT to follow an arc, curvature or the like, such that when the CT issues from the lowermost end of the lubricator which is connected to the wellhead assembly, e.g., BOP or the like, the CT will be on an axis substantially coincident with the wellhead assembly/wellbore.

In another aspect of the present invention there is provided an apparatus for performing earth borehole operations comprising a mast carrying a top drive which is longitudinally movable along the length of the mast, the top drive having an axis, typically determined by a threaded spindle which can engage the box end of threaded tubular connections, the axis of the top drive passing through the threaded spindle being normally in alignment with a wellbore assembly/wellhead disposed below the mast when the mast is in a substantially vertical position. The apparatus further includes a CT injector which is attached to the mast such that the axis of the CT injector, as determined by an axis passing through the CT issuing from the injector, is offset, e.g., at an angle with respect to the axis passing through the wellhead/wellbore and for that matter the top drive, the apparatus further including a lubricator which can be attached to the CT injector and to the wellhead, BOP, etc., whereby the CT issuing from the CT injector initially issues from the CT injector on an axis which is at an angle to an axis passing through the wellhead/wellbore but which, when it issues from the lower end of the lubricator which is coupled to the wellhead assembly, e.g., BOP, is on an axis which is coincident with the axis of the top drive, assuming the latter axis is coincident with the axis of the wellhead assembly/wellbore.

In one respect, the present invention provides a lubricator for use with a CT injector, the lubricator having an elongated housing with a first end and a second end, there being a guide system disposed in the housing for guiding CT passing through the housing. There is a first director proximal the first end of the housing to direct CT passing through the housing in a first direction and a second director proximal the second end of the housing to direct CT passing through the housing in a second direction.

BRIEF DESCRIPTION OF THE DRAWINGS

FIG. 1 is a side elevational view showing a preferred embodiment of the rig of the present invention with a top drive carried by a mast for longitudinal movement therealong, a CT injector attached to the mast but having its axis non-coincident with the axis of the top drive and the wellhead assembly/ wellbore and also showing schematically one embodiment of the lubricator of the present invention.

FIG. 2 is a side elevational view of the rig shown in FIG. 2 in a transport mode but without the lubricator.

FIG. 3 is a side elevational view of one embodiment of the lubricator of the present invention.

FIG. 4 is an enlarged cross-sectional view taken along the lines 4-4 of FIG. 4.

FIG. 5 is an enlarged cross-sectional view of another form of guide system for use in the lubricator of the present invention.

FIG. 6 is an enlarged cross-sectional view of another form of guide system for use in the lubricator of the present invention.

FIG. 7 is a partial, side elevational view, partly in section, of one embodiment of the lubricator of the present invention.

FIG. 8 is a partial, side elevational view, partly in section, of another embodiment of the lubricator of the present invention.

FIG. 9 is a side elevational view, partly in section, of another embodiment of the lubricator of the present invention, and FIG. 10 is a partial, side elevational view, partly in section, of another embodiment of the lubricator of the present invention.

DETAILED DESCRIPTION OF PREFERRED EMBODIMENTS

Referring first to FIG. 1, there is shown a rig substantially as shown in the '931 and '036 Applications, the rig including a substructure 10, substructure 10 having a working platform 12. Mounted on substructure 10 is a telescoping, pivoting mast shown generally as 14, mast 14 having an upper section 16 and a lower section 18 and being pivotable about a hinge 20 connected to substructure 10. Mounted in mast 16 for longitudinal movement therealong, is a top drive 22 which is attached to cables 24 which in turn are attached to a crown block assembly 26 with sheaves 27, in the well known manner, the cables 24 being connected to a draw-works 33. Although not shown, it will be understood that top drive 22 is mounted on rails, guides or the like in mast 14 such that it can be moved vertically or longitudinally therealong. Additionally, although not shown, it will be understood that mast 14 generally comprises a pair of spaced elongate columns or frame members, the top drive being positioned between the columns. Thus, lower section 18 would be comprised of two spaced columns, and upper section 16 would be comprised of two spaced columns, the columns forming upper section 16 being telescopically received in the columns forming lower section 18. It will be understood that the mast could be a single, non-telescopy structure.

Removably attached to the mast 14 is a CT injector shown generally as 28, CT injector 28 being secured to mast 14 by a bracket 29 (see FIG. 2), bracket 29 being of a type which may be held by pins, dogs, or other latching devices, so as to permit CT injector 28 to be selectively attached to and removed from mast 14. CT injector 28 also includes a guide or gooseneck comprised of first and second sections 30 and 32 which are pivotally secured to one another. In the configuration shown in FIG. 2, section 32 of the guide has not been extended by the cylinder 34, as FIG. 2 is depicting in part the setup procedure. However, and as well known in the art, when section 32 is extended by cylinder 34 it forms a gradual arc as best seen in FIG. 1, to minimize the bend that the CT has to endure when being played off the reel 50 and into the CT injector 28. It will be understood that the term "CT injector" or similar terms when referring to the CT injector, is intended to include any powered equipment for moving CT into or out of a well whether for drilling, workover or other purposes. As described more fully hereafter, CT injector 28 is connected to a lubricator shown generally as 36.

The term "top drive" as used herein is intended to include not only conventional top drives well known to those skilled in the art but also power swivels, power tongs, and other equipment typically used, normally with a rotary table, to make up jointed (threaded) tubular members for use in the drilling and/or servicing of oil and gas wells.

FIG. 2 depicts mast 14 in a partially lowered position wherein upper section 16 has been telescoped into lower section 18. Although not shown in FIG. 2, it will be understood that when the system is not in use, section 16 would be telescoped downwardly into section 18 and the mast 14 disposed in the generally horizontal position. In this regard, in FIG. 2 the mast 14 is shown in a slightly raised position such that the CT injector 28 can be attached as described hereafter. To raise and lower mast 14, there is provided a piston/cylinder arrangement 38 pivotally connected at 40. When in the completely lowered position, mast 14 would rest on a platform 42 forming part of substructure 10.

As can be seen in FIG. 1, CT injector 28 is mounted on a trailer 44 having wheels 46 and a tongue 48 by means of which trailer 48 can be towed by a truck or the like. Trailer 44 also carries a reel 50 of CT 52. Thus, it will be understood that prior to attachment of CT injector 28 to the mast 14, mast 14 could be substantially horizontal resting on platform 42. When trailer 44 carrying CT injector 28 and reel 50 are brought to the site where substructure 10 is located, mast 14 would be raised by pivoting cylinder 38 to a position such that mast 14 was at a slight angle to the horizontal as shown in FIG. 2. Trailer 44 could then be positioned so that it was adjacent substructure 10. In this position, CT injector 28 would be closely adjacent mast 14 and by means of bracket or mount 29 could be removably secured to mast 14. To this end, mounted on trailer 44 is a cylinder 56 which is used to raise CT injector to the point where it can be attached to mast 14, it being understood that in transport, CT injector 28 would be lying on the platform 45 of trailer 44. Once attached to mast 14, mast 14 could then be raised to a vertical position and upper section 16 telescoped upwardly to its full length which would then position CT injector 28 as shown in FIG. 1.

As is well known to those skilled in the art, CT injectors typically employ a lubricator whether the CT operation involves drilling or some other activity, e.g., workover. Generally speaking a lubricator is an elongate, tubular member or housing which has a lower end which can be attached to the top of a wellhead/assembly, e.g., christmas tree, BOP, etc., of a well so that CT tools, etc. may be inserted into a well under pressure. Conventional lubricators have a top assembly which can include a high pressure grease injection section and sealing elements. Additionally, a lubricator typically has telescoping sections located at the bottom which connect to the wellhead assembly. In effect, a lubricator is a sealed, pressure housing through which the CT passes. Conventional prior art lubricators are substantially straight, i.e., without any curvature since their usage in conjunction with conventional CT systems, is such that they can be positioned with their long axis coincident with the centerline of the wellhead assembly. Thus, with the top of the lubricator attached to the CT injector, CT issuing from the injector passes in an essentially straight line through the lubricator through the wellhead assembly and hence into the well.

With reference to FIG. 1, it can be seen that an axis A running through injector 28 is at an angle to an axis B running through top drive 22. More specifically, in FIG. 1, axis B is in line with wellhead 54 whereas axis A is not. Thus, in the condition shown in FIG. 1, wellbore operations can be conducted with top drive 22 but not with CT injector 28. To solve this problem, as disclosed in the '931 and '036 Applications, mast 14 could be moved in the direction of arrow C, essentially pivoting around hinge 20 until axis A was coincident with an axis passing through wellhead/wellbore 54. As noted above, in certain cases it would be desirable if mast 14 could be maintained in the position shown in FIG. 1 and both operations with top drive 22 and CT injector 28 could be conducted. As can be seen in FIG. 1, there is a lubricator 36 which extends from CT injector 28 to just above wellhead/wellbore 54. As can be further seen, CT lubricator 36 has an arc or curve such that CT 52 issuing from CT injector 28 will be guided by lubricator 36 such that as it issues from the bottom of lubricator 36, it will be on an axis coincident with axis B which in turn is coincident with wellhead/wellbore 54.

Thus, the housing of the lubricator of the present invention in one embodiment, rather than being straight like conventional prior art lubricators, has a slight curve, arc or radius, e.g., a radius of 300 feet, and is designed to accommodate the universal rig assembly shown in FIG. 1 and described in the '931 and '036 Applications. As is noted in the '931 and '036 Applications, the CT injector 28 is attached to the mast such that the axis of the CT injector 28 is at an angle to the axis of the top drive 22 and, more importantly, is at an angle to the axis of the wellhead/wellbore 54. Accordingly, as disclosed in the '931 and '036 Applications, in order for the axis of the CT injector to be brought into alignment with the axis of the wellhead/wellbore 54, it is necessary to tilt or pivot the mast such that the axis of the CT injector (axis A) is coincident with the axis of the wellhead 54 which means that the axis of the top drive (axis B) is now at an angle to the axis of the wellhead/wellbore 54. The lubricators of the present invention permit the mast 14 to remain in a vertical, untilted position, but still ensures that CT 52 issuing from the end of the lubricator enters the wellhead 54 on an axis coincident with that of the wellhead 54, i.e., coincident with axis B when the mast is vertical.

Referring now to FIGS. 3-7, the lubricator 36 of one embodiment of the present invention is shown in greater detail. As best seen in FIG. 3, lubricator 36 is comprised of an elongate, tubular housing 70 which is generally rectangular in shape but could have any cross-sectional configuration. As can also be seen from FIGS. 3 and 7 housing, 70 has a slight arc or curvature, the arc being determined by a radius which, in the embodiment shown would be 300 feet as shown by arrow D. It will be understood that the radius of 300 feet is merely exemplary and that the lubricator 36 could have arcs formed by smaller or larger radii depending upon the relative position of the wellhead 54 and the CT injector 28, i.e., the greater the distance between CT injector 28 and the wellhead 54, the larger the radius and the less the curvature of the lubricator 36. Thus, the degree of curvature or arcing of lubricator 36, whether on a circular radius or some other curve, is just sufficient to gradually alter the centerline of the CT from a first position or direction, as it issues from CT injector 28, where it is not coincident with the axis of the wellhead 54 to a second position or direction, when it issues from the lower end of lubricator 36 where it is coincident with the axis of the wellhead 54.

Lubricator 36, is provided with a universal joint 72 adjacent its upper end so that it can be moved into and out of line with wellhead assembly 54. As is typical in the case of lubricators, lubricator 36 may be attached to CT injector 28 by a threaded connection or other such connection well known to those skilled in the art. As also known to those skilled in the art, the connector between lubricator 36 and CT injector 28 can include a sealing assembly and a high pressure grease injection system. At the lower end of housing 70, is one or more telescoping section(s) 74 which, as well known to those skilled in the art, can be attached to a wellhead assembly, e.g., wellhead 54. Telescoping section(s) 74 is connected to a winch line 76 which runs to a winch 78 secured to bracket 29 which in turn is secured to the mast 14. In a suitable manner well known to those skilled in the art, winch 78 in conjunction with winch line 76 can be used to raise or lower telescoping section(s) 74. In this regard, once lubricator 36 is positioned over the wellhead 54, telescoping section(s) 74 is lowered via gravity to engage the wellhead 54. It will be understood as well known to those skilled in the art that the telescoping section(s) 74 can be provided with pressure seals to ensure that, with the typical pressure seals at the top of the lubricator, the internal pressure of the wellbore can be accommodated, i.e., the lubricator is a pressurized housing.

Proximal the upper end 83 of and internally of housing 70, are a pair of clustered guide rollers 80, 81 which guide the CT 52 as it enters housing 70. Likewise, at the lower end 85 of housing 70, there are another pair of clustered guide rollers 82, 87 which guide the CT issuing from the end of lubricator 36 toward the wellhead 54. Basically, at its upper end 83 housing 70 has a first axis while at its lower end 85 housing 70 has a second axis, the first and second axes being at an angle to one another. In this embodiment, the goal is to move the CT issuing from injector 28 from the first direction, i.e., the first axis to the second direction, i.e., the second axis. In other words, lubricator 36 moves the CT from a direction generally along axis A in FIG. 1 to a direction generally along axis B in FIG. 1. As can be seen with reference to FIG. 3, there are a plurality of roller pairs clustered along the length of housing 70 in the sense that the rollers of the clustered pairs are relatively close to one another and on opposite sides of the CT 52 as it passes through housing 70. In effect, the rollers provide a guide system through housing 70, the net effect of which is to guide the CT 52 issuing from CT injector 28 through the arc of housing 70, i.e., from axis A (FIG. 1) to axis B (FIG. 1). It will be understood that the number of clustered pairs of rollers in housing 70 and their relative spacing along housing 70 will be a function of the size of the CT, its wall thickness, etc. Obviously with smaller, more flexible CT, fewer numbers of clustered pairs of rollers would be required than if the CT was of a larger diameter and/or greater wall thickness. However, in general, the roller pairs will be spaced sufficiently close to one another such that the CT does not rub along the interior walls of housing 70 which would cause unnecessary wear on CT 52.

An intermediate portion of the embodiment of the lubricator 36 shown in FIG. 3, is shown in greater detail in FIG. 7. As can be seen in FIG. 7, in combination with FIGS. 3 and 4, housing 70 is generally rectangular in shape having first and second spaced side walls 70A and 70B connected by first and second spaced side walls 70C and 70D. Intermediate rollers 84 and for that matter any of the rollers discussed above, are rotatably journaled in housing 70 on axles 100 which extend through side walls 70C and 70D, held by threaded caps or the like 102. As can be seen with respect to FIG. 7, housing 70 has a low side indicated by arrow L and a high side indicated by an arrow H. Because of the fact that guiding or directing of the CT 52 from axis A (FIG. 1) to axis B (FIG. 1) is accomplished by the curvature or arcing of housing 70, the guide roller clusters can be generally uniformly spaced from their respective side walls, i.e., they define an arc or curve similar to the arc of housing 70. Thus, as seen in FIG. 7, the rollers on the high side H of housing 70 are all substantially equally spaced from wall 70A forming the low side L of housing 70. Likewise, the rollers 89 nearest the low side L of housing 70 are equally spaced from wall 70A forming the low side L of housing 70. Thus, in FIG. 7 there is a combination of the arced or curved shape of housing 70 in combination with the roller clusters that maintain the CT 52 in that arced or curved path that effects the change in direction of the CT 52 from a first axis (axis A) as it enters housing 70 to a second axis (axis B) as it exits housing 70.

In addition to rollers, various other guide members can be employed in the embodiment of FIG. 7. Thus as shown in FIG. 5, the guide system could be comprised of rollers 84 proximal the low side L of housing 70 and guide blocks 104 proximal the high side H of housing 70 or vice versa.

In still another embodiment of the guide system, as shown in FIG. 6 pairs of clustered guide blocks 106 and 108 could be employed. Again, as in the case with the use of pairs of roller clusters as shown in FIGS. 3, 4 and 7, since it is the arced shape of housing 70 in cooperation with any of the guide systems shown in FIG. 5 or 6 that effects the direction of the CT 52 from one axis to the other axis, there would generally be a uniform spacing in the sense that, with respect to FIG. 5, rollers 84 would all be substantially the same distance from low side L and blocks 104 would all be the same distance from high side H. The same would be true of blocks 106 and 108 shown in FIG. 6.

The material of construction of the guide blocks which are essentially wear pads designed to minimize any wearing of the CT 52 as it passes through the lubricator 36, can be plastics such as nylon, polyurethane, polycarbonates, engineered plastics, etc., but in any event would be hard enough so that they did not wear easily. Additionally, the guide blocks, e.g., blocks 104, 106 and 108, could be made of brass or other relatively soft metals which again would not cause undue wearing of the CT 52 passing through lubricator 36. While the rollers, e.g., rollers 84, could be made of similar materials, they could also be made of harder metals since their engagement with CT 52 is rolling friction rather than sliding friction as in the case of guide blocks. In the case of the embodiment of FIGS. 3 and 7, regardless of the type of guide system used, e.g., rollers, guide blocks or a combination thereof, the goal is to direct the CT along the arc or curve of housing 70.

While thus far the lubricator 36 has been described as being comprised of a curved or arced housing or elongate tubular member, the invention is not so limited. Turning then to FIGS. 8-10, there are shown other embodiments of the lubricator of the present invention wherein the housing is substantially straight, i.e., without any arc or curvature such as the housing 70. Thus, as described hereafter, the CT 52 would be directed from axis A (FIG. 1) to axis B (FIG. 1) by means of an internal guide system which could gradually change the arc or direction of the CT as it moved through the housing. In effect, in such a lubricator, i.e., with a straight housing, the internal guide system would convert the direction of the CT 52 issuing from CT injector 28 from axis A (FIG. 1) substantially to axis B (FIG. 1).

Referring then to FIG. 8, there is shown another embodiment of the lubricator of the present invention 36A having a substantially straight housing 200 which, like housing 70 could be rectangular in cross-section or for that matter of any other cross-sectional configuration. In the embodiment shown in FIG. 8, the guide system employed is a series of rollers 120 and guide blocks 122 respective clusters of which are spaced along the length of housing 200. Housing 200 has a first side wall 202 and a spaced, second side wall 204 which are substantially parallel to one another. As can be seen, while rollers 120 are substantially the same dimensionally, guide blocks 122 A-D are of a varying, lateral dimension, guide block 122A toward the upper end 201 of housing 200 having a greater lateral dimension as measured from side wall 204 than intermediate guide blocks 122B or 122C. Toward the lower end 205 of housing 200, the guide blocks again increase in their lateral dimension away from side wall 204. Thus, guide block 122D which is lower in lubricator 36A than guide block 122C extends laterally outwardly from side wall 204 more than guide block 122A or for that matter guide block 122B. In other words, the guide blocks 122A-122D define an arcing or curving pathway along which CT 52 passes. In a similar vein, guide rollers 120A-D are spaced along housing 200 such that closer to the upper end 201 of housing 200, the rollers are relatively close to side wall 202 whereas in the intermediate section of housing 200, the guide rollers 200 B and C are spaced further from side wall 202. However, as can be partially seen in FIG. 8, towards the lower end of housing 200, guide roller 120D is positioned such that it is closer to side wall 202 and thus the pattern of the guide rollers forms an arcing or curving pathway through which the CT 52 passes. In this manner, CT 52 is gradually directed from a first axis A (FIG. 1) to a second axis B (FIG. 1) through a gradual transition dictated by the positioning of the roller-guide block clusters in the housing 200.

Referring now to FIG. 9 there is shown another embodiment of the lubricator of the present invention. The lubricator 36B shown in FIG. 9 is similar to that shown in FIG. 8 with the exception that rather than the use of rollers/guide block clusters, the embodiment of FIG. 9 employs clusters of rollers spaced along housing 300 of lubricator 36B. As can be seen, and as in the case of the embodiment shown in FIG. 8, the rollers 205 adjacent wall 208 are staggered vis-à-vis their lateral distance from wall 208 so as to define an arc for CT 52 to pass thereto. Likewise the rollers 207 closest to side wall 210 are likewise positioned such that they form an arc or curve through which CT 52 can pass.

Turning now to FIG. 10 there is shown still another embodiment of the lubricator of the present invention. Lubricator 36C shown in FIG. 10, unlike lubricators 36A or 36B, employs no guide rollers but rather uses only guide blocks. Housing 211 has first and second spaced, opposed side walls 212 and 214. A series of guide blocks 216A-216D extend laterally outwardly from side wall 214 for different lateral distances so as to form a curved or arced pathway through which CT 52 can pass. In a similar manner, guide blocks 218A-218D extend outwardly in different lateral distances from side wall 212 so as to again form an arc or curved pathway through which CT 52 passes as it travels through housing 211.

In cases where the lubricator employed a straight housing such as shown in FIGS. 8, 9 and 10, in order to attach the lubricator at its lower end to the wellhead assembly, an angled flange could be employed as would be readily understood by those skilled in the art.

Although not shown, to position the lower end of lubricator 36 over the wellhead 54, a suitable cylinder arrangement could be attached to substructure 10 which could alternately move lubricator 36 from a position over wellhead 54 to a position where it was actually displaced laterally out of any axis parallel to the mast 14. In this regard, it should be noted that because CT lubricator 36 is connected to CT injector 28 by means of the universal joint 72, this movement would not effect any bending of tubular section 70.

To attach any of the lubricators to CT injector 28, several methods can be employed. With mast 14 in its erect position generally vertically aligned relative to substructure 10, as shown in FIG. 1, by using winch 78, the lubricator could be raised and attached to CT injector 28 in the well known manner. Alternatively, lubricator 36 could be carried on trailer 44 and with the use of winch 78 and manual manipulation, attached to CT injector 28 when mast 14 was in the lowered position as shown in FIG. 2 following which CT injector 28 and mast 14 and the lubricator raised to the vertical position. Alternatively, a separate jib crane could manipulate the lubricator. It should be noted that as disclosed in the '931 Application, the CT injector could be fixedly attached to the mast or as taught in the '036 Application, the CT injector can be removably attached to the mast.

It will be understood that trailer 44 can be any wheeled carrier whether self-propelled or pulled and can also be a skid. Likewise, substructure 10 is intended to include any kind of structure upon which mast 14 can be mounted and/or carried and can also include a wheeled structure which can also be self-propelled. It is also contemplated that substructure 10 and trailer 44 could be one in the same.

While the lubricator of the present invention has been shown in connection with the rig design as disclosed in the '931 and '036 Applications, i.e., where the axis of the CT injector and the axis of the top drive are at an angle to one another, it could also be used in other so-called universal rig structures wherein there is both a top drive and the CT injector. For example, it could find use in the so-called universal rigs shown in Canadian Patent No. 2425448.

As can be seen from the above, the lubricator/universal rig of the present invention provides an easy method to switch from top drive operations involving jointed or threaded tubulars to coiled tubing operations with minimum manipulation.

What is claimed is:

1. An apparatus for conducting coil tubing operations, comprising:
    a coil tubing injector;
    a coil tubing guide connected to and mounted above said coil tubing injector;
    a lubricator operatively connected to said coil tubing injector below said coil tubing injector, said lubricator comprising:
        an elongated, sealable housing having a first end and a second end;
        a guide system disposed in said housing for guiding said coil tubing passing through said housing in a first direction proximal said first end of said housing and a second, different direction proximal said second end of said housing;
        a first director proximal said first end of said housing to direct said coil tubing in a first direction; and
        a second director proximal said second end of said housing to direct said coil tubing in a second direction, wherein said second direction is different from and at an angle relative to said first direction.

2. The apparatus of claim 1 wherein said guide system comprises a first director proximal said first end of said housing, and a second director proximal said second end of said housing.

3. The apparatus of claim 2, wherein there is at least one intermediate director between said first and second directors to direct said coil tubing toward said second direction.

4. The apparatus of claim 1, wherein said first end of said housing has a first axis and said second end of said housing has a second axis, said first and second axes being at an angle to one another.

5. The apparatus of claim 1, wherein said housing is arced.

6. The apparatus of claim 1, wherein said guide system comprises a first set of longitudinally spaced inner guide rollers and a second set of longitudinally spaced outer guide rollers, at least some of respective ones of said inner guide rollers and said outer guide rollers being clustered along the length of said housing.

7. The apparatus of claim 1, wherein said guide system comprises a plurality of longitudinally spaced, inner rollers and a plurality of longitudinally spaced outer guide blocks, at least some of respective ones of said inner rollers and said outer guide blocks being clustered along the length of said housing.

8. The apparatus of claim 1, wherein said guide system comprises a plurality of longitudinally spaced inner guide blocks and a plurality of longitudinally spaced outer guide blocks, at least some of respective ones of said inner and outer guide blocks being clustered along the length of said housing.

9. The apparatus of claim 1, wherein said elongated housing is rectangular in cross-section.

10. The apparatus of claim 1, wherein said housing is connected at its first end to a universal joint.

11. The apparatus of claim 1, wherein said housing is substantially straight.

12. The apparatus of claim 11, wherein said guide system comprises a first set of longitudinally spaced inner rollers and a second set of longitudinally spaced outer rollers at least some of respective ones of said inner and outer rollers being clustered along the length of said housing.

13. The apparatus of claim 1, wherein said housing comprises a first end and a second end and first and second, spaced side walls, said first director comprising a first inner guide and a first outer guide, said first inner and outer guides being clustered proximal said first end of said housing and said second director comprises a second inner guide and a second outer guide, said second inner and outer guides being clustered proximal said second end of said housing, said first inner guide being close to said first side wall, said first outer guide being closer to said second side wall, said second inner guide being further from said first side wall than said first inner guide, said second outer guide being close to said second side wall than said first outer guide.

14. The apparatus of claim 13, wherein said inner and outer guides comprise rollers.

15. The apparatus of claim 13, wherein said inner guides comprise rollers and said outer guides comprise guide blocks.

16. The apparatus of claim 13, wherein said inner and outer guides comprise guide blocks.

17. The rig of claim 16 wherein the mast is pivotable relative to the support.

18. A rig for selectively inserting coil tubing or threaded tubulars into a wellbore comprising:
    a support;
    a mast extending upward from said support;
    a top drive carried by said mast for longitudinal movement therealong, said top drive having a first axis extending therethrough;
    a CT injector carried by said mast, said injector having a second axis offset from said first axis and
    a lubricator attached to and below said CT injector, said lubricator comprising: an elongated, sealable housing having a first end and a second end; a guide system disposed in said housing for guiding said coil tubing passing through said housing in a first direction proximal said first end of said housing and a second, different direction proximal said second end of said housing; a first director proximal said first end of said housing to direct said coil tubing in a first direction; and a second director proximal said second end of said housing to direct said coil tubing in a second direction, wherein said second direction is different from and at an angle relative to said first direction.

19. The rig of claim 18 wherein the injector is rigidly secured to the mast by a support bracket.

20. The rig of claim 18 wherein the CT injector is removably secured to the mast.

* * * * *